(12) United States Patent
Gruner-Nielsen (10) Patent No.: US 8,107,783 B2
(45) Date of Patent: Jan. 31, 2012

(54) STRETCHER FIBER AND MODULE

(75) Inventor: Lars Gruner-Nielsen, Bronshoj (DK)

(73) Assignee: OFS Fitel, LLC, Norcross, GA (US)

( * ) Notice: Subject to any disclaimer, the term of this patent is extended or adjusted under 35 U.S.C. 154(b) by 258 days.

(21) Appl. No.: 12/329,561

(22) Filed: Dec. 6, 2008

(65) Prior Publication Data
US 2010/0002997 A1   Jan. 7, 2010

Related U.S. Application Data

(60) Provisional application No. 61/078,589, filed on Jul. 7, 2008.

(51) Int. Cl.
*G02B 6/036* (2006.01)
*G02B 6/02* (2006.01)

(52) U.S. Cl. ......................... 385/127; 385/123

(58) Field of Classification Search .................... 385/127
See application file for complete search history.

(56) References Cited

U.S. PATENT DOCUMENTS

| | | | |
|---|---|---|---|
| 6,493,494 B1 | 12/2002 | Rousseau et al. | |
| 6,498,887 B1 * | 12/2002 | Gruner-Nielsen et al. | ... 385/123 |
| 6,819,847 B2 * | 11/2004 | Matsuo et al. | ................. 385/123 |
| 7,486,436 B1 * | 2/2009 | Kuksenkov et al. | .......... 359/333 |
| 2004/0105638 A1 | 6/2004 | Sillard et al. | |
| 2004/0146258 A1 | 7/2004 | Yamamoto et al. | |
| 2005/0201700 A1 * | 9/2005 | Aikawa et al. | ................. 385/123 |

FOREIGN PATENT DOCUMENTS

| | | |
|---|---|---|
| EP | 1434071 A1 | 6/2004 |
| EP | 1575196 A1 | 9/2005 |
| EP | 1865348 A2 | 12/2007 |
| JP | 20030255170 A | 9/2003 |
| WO | 2004036276 A1 | 4/2004 |

OTHER PUBLICATIONS

Jiang et al., "Reverse Dispersion Fiber with Depressed Core-Index Profile for Dispersion-Managed Fiber Pairs," Journal of Optical Communications (2008), Fachverlag Schiele & Schon, Berlin, Germany, vol. 29, No. 1, pp. 12-15.
European Patent Office, European Search Report, Application No. EP09007568, published Jan. 13, 2010.

* cited by examiner

*Primary Examiner* — Omar Rojas
(74) *Attorney, Agent, or Firm* — Jacobs & Kim LLP (57) ABSTRACT

A stretcher fiber includes a core region, inner trench region, ring region, outer trench region, and outer cladding region. The core region has a radius $r_1$, a refractive index $n_1$, and a positive effective refractive index $\Delta n_1$ with respect to an outer cladding region having an outer radius $r_0$ and a refractive index $n_0$, where $\Delta n_0$ is equal to $n_1 - n_0$. The inner trench region surrounds the core region and has an outer radius $r_2$, a refractive index $n_2$ less than $n_0$, and a negative effective refractive index $\Delta n_2$ equal to $n_2 - n_0$. The ring region surrounds the trench region and has an outer radius $r_3$, a refractive index $n_3$ greater than $n_0$, and a positive effective refractive index $\Delta n_3$ equal to $n_3 - n_0$. The outer trench region surrounds the ring region and has an outer radius $r_4$, a refractive index $n_4$ less than $n_0$, and a negative effective refractive index $\Delta n_4$ equal to $n_4 - n_0$. The outer cladding region surrounds the outer trench region. The values of $r_0$, $r_1$, $r_2$, $r_3$, $r_4$, $\Delta n_1$, $\Delta n_2$, $\Delta n_3$, and $\Delta n_4$ cause the fiber to have a negative dispersion and to have a relative dispersion slope greater than 0.005 nm⁻ at a specific wavelength within a selected operating wavelength band. Additionally, the stretcher may be used in combination with a second fiber to match the dispersion and RDS of a selected grating compressor.

22 Claims, 11 Drawing Sheets

| Fiber Region | Material | Dopant(s) | n | $\Delta n (\times 10^{-3})$ | Width | Outer Radius |
|---|---|---|---|---|---|---|
| Core | $SiO_2$ | $GeO_2$ | $n_1$ | $\Delta n_1 = n_1 - n_0 = 21.9$ | N/A | 0.98 µm |
| Inner Trench | $SiO_2$ | $GeO_2$ F | $n_2$ | $\Delta n_2 = n_2 - n_0 = (-8.9)$ | 2.96 µm | 3.94 µm |
| Ring | $SiO_2$ | $GeO_2$ F | $n_3$ | $\Delta n_3 = n_3 - n_0 = 6.8$ | 1.38 µm | 5.32 µm |
| Outer Trench | $SiO_2$ | $P_2O_5$ F $GeO_2$ (optional) | $n_4$ | $\Delta n_4 = n_4 - n_0 = (-1.0)$ | 1.76 µm | 7.08 µm |
| Outer Cladding | $SiO_2$ | none | $n_0$ | $\Delta n_0 = n_0 - n_0 = 0.0$ | 55.42 µm | 62.50 µm |

| | @ 1030 nm | @ 1060 nm |
|---|---|---|
| Relative Dispersion Slope | 0.0094 nm$^{-1}$ | 0.0130 nm$^{-1}$ |
| Dispersion | −164 ps/(nm·km) | −236 ps/(nm·km) |
| Attenuation | 2.9 dB/km | 2.6 dB/km |
| Modefield Diameter (Petermann II) | 2.9 μm | 3.0 μm |
| Wavelength for 0.5 dB loss for one turn around a mandrel with a diameter of 30 mm | 1072 nm | |
| Cut-off Wavelength | 970 nm | |

| 351. PROVIDE A LENGTH OF STRETCHER FIBER |

| 352. PROVIDE A LENGTH OF A SECOND FIBER HAVING A DISPERSION AND RDS, AT LEAST ONE OF WHICH IS DIFFERENT FROM THAT OF THE STRETCHER FIBER |

| 353. ADJUST THE RESPECTIVE LENGTHS OF THE STRETCHER FIBER AND THE SECOND FIBER SUCH THAT, WHEN SPLICED TOGETHER, THE TOTAL COMBINED DISPERSION AND RDS OF THE STRETCHER FIBER AND THE SECOND FIBER MATCH THAT OF A SELECTED COMPRESSOR |

STRETCHER FIBER AND MODULE

CROSS REFERENCE TO RELATED APPLICATION AND INCORPORATION BY REFERENCE

The present application claims the priority benefit of U.S. Provisional Patent Application Ser. No. 61/078,589, filed on Jul. 7, 2008, the disclosure and drawings of which are incorporated by reference herein in their entirety.

BACKGROUND OF THE INVENTION

1. Field of the Invention

The present invention relates generally to optical fiber devices and methods, and in particular to an improved stretcher fiber and module for use in a chirped pulse amplification system.

2. Background Art

Chirped pulse amplification (CPA) is a technique for amplifying an ultrashort laser pulse up to the petawatt ($10^{15}$ watt) level. A laser generates an output comprising a series of ultrashort pulses of relatively low power. These pulses are then fed into a stretcher module having a dispersion that causes the pulses to stretch out. The stretched pulse output is then fed into a high-power amplifier. The stretched, amplified pulses are then fed into a compressor module having a dispersion opposite to that of the stretcher module to produce a recompressed amplified pulse output. By stretching the pulses prior to amplification, it is possible to reduce the peak power of the pulses, and to avoid undesirable nonlinearities.

Currently, stretcher modules are fabricated using free space diffraction gratings. However, for a number of reasons, it would be desirable to use an all-fiber-based solution. Although there have been efforts to create a fiber-based stretcher, these attempts have fallen short. In one case, 400 meters of standard low-cutoff single mode fiber was used as a stretcher. However, as a compressor typically has a positive RDS, and a standard low-cutoff single mode fiber typically has a negative RDS, no dispersion slope match is readily obtainable. To overcome this issue, a complicated balancing of the slope mismatch and nonlinearities in the amplifier fibers is required. In another case, a fiber with an RDS of 0.0053 $nm^{-1}$ at 1050 nm was described. That fiber matches a grating compressor with a dispersion of $\beta_2 = -1.6$ $ps^2$ (D=2.7 ps/nm) at 1050 nm, and is of limited utility.

SUMMARY OF THE INVENTION

These and other issues in the art are addressed by the present invention, an aspect of which provides a new stretcher fiber. The fiber includes a core region, inner trench region, ring region, outer trench region, and outer cladding region. The core region has a radius $r_1$, a refractive index $\Delta n_1$, and a positive effective refractive index $\Delta n_1$ with respect to the outer cladding region, which has an outer radius $r_0$ and a refractive index $n_0$. The core region effective refractive index $\Delta n_1$ is equal to $n_1 - n_0$. The inner trench region surrounds the core region and has an outer radius $r_2$, a refractive index $n_2$ less than $n_0$, and a negative effective refractive index $\Delta n_2$ equal to $n_2 - n_0$. The ring region surrounds the trench region and has an outer radius $r_3$, a refractive index $n_3$ greater than $n_0$, and a positive effective refractive index $\Delta n_3$ equal to $n_3 - n_0$. The outer trench region surrounds the ring region and has an outer radius $r_4$, a refractive index $n_4$ less than $n_0$, and a negative effective refractive index $\Delta n_4$ equal to $n_4 - n_0$. The outer cladding region surrounds the outer trench region. The values of $r_0$, $r_1$, $r_2$, $r_3$, $r_4$, $\Delta n_1$, $\Delta n_2$, $\Delta n_3$, and $\Delta n_4$ cause the fiber to have a negative dispersion and have a relative dispersion slope greater than 0.005 $nm^{-1}$ at a specific wavelength within a selected operating wavelength band.

According to a further aspect of the invention, the new stretcher fiber is used in combination with a second fiber or fiber device to match the dispersion and RDS of a selected grating compressor.

DETAILED DESCRIPTION

Aspects of the present invention are directed to systems and techniques that provide an all-fiber-based solution for a stretcher module for chirped amplification in a short-pulse fiber laser operating within a specified wavelength band, e.g., 1000-1100 nm. A first aspect of the invention is directed to a new stretcher fiber that may be used by itself directly in a stretcher module. According to a further aspect of the invention, a stretcher module is constructed by splicing together a combination of the new stretcher fiber and at least one other fiber selected such that the stretcher module has a desired overall dispersion and overall RDS.

Following a discussion of the issues raised in the design of a stretcher module, there is provided a detailed description of the new stretcher fiber and exemplary combinations of the fiber with other fibers to construct a stretcher module. It is noted that the described systems and techniques may be used to construct an all-fiber stretcher module having an RDS that is sufficiently high to be used in conjunction with currently used grating compressors.

Short pulse fiber lasers with high pulse energies are desirable for many applications, such as micromachining, and the like. Chirped pulse amplification has been shown to be a durable scheme for producing short pulses, i.e., with a duration of less than 1 picosecond, and pulse energies on the microjoule level, or even the millijoule level.

Figure 1:
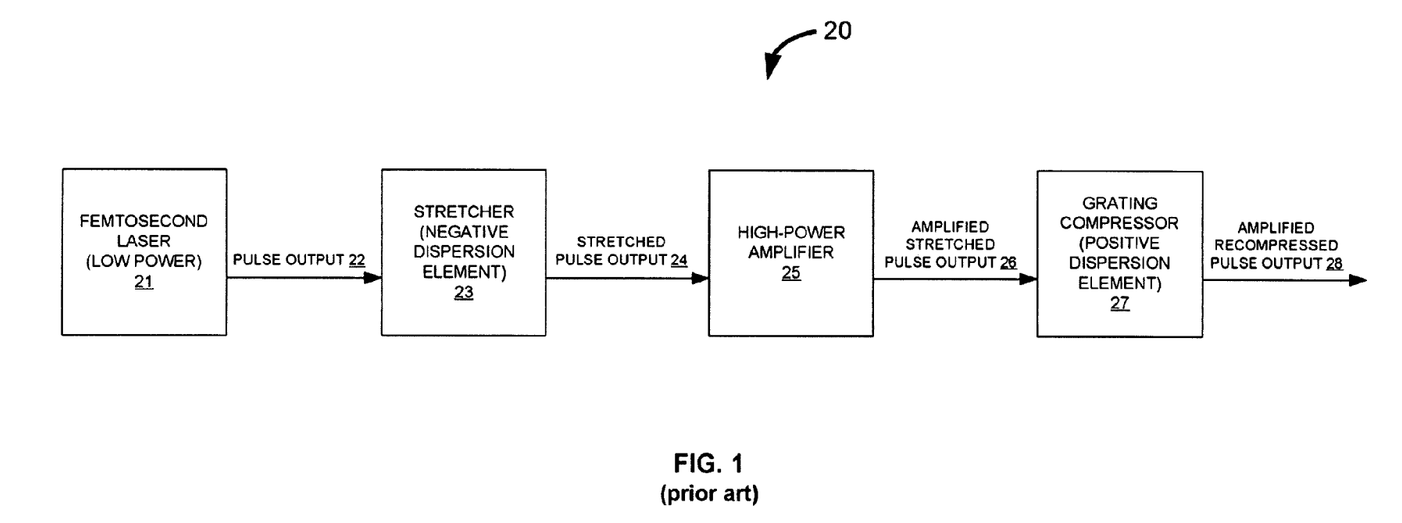
FIG. 1 is a diagram of a chirped pulse amplification system.

FIG. 1 shows a diagram of a typical chirped pulse amplification system 20. A low-power femtosecond oscillator 21 provides a pulse output 22 that is fed into stretcher module 23, which stretches the pulse output, typically by a factor of more than $10^3$. The stretcher module 23 is highly dispersive, in order to reduce the peak power of the pulses. The stretched pulse output 24 can then be linearly amplified in a high-power amplifier 25. The amplified, stretched pulse output 26 is then recompressed by a compressor unit 27, which is a dispersive element with a dispersion opposite to that of the stretcher unit, resulting in an amplified, recompressed pulse output 28.

To characterize the group velocity dispersion, different parameters and their derivatives are used. Within the field of optical fibers, the D-parameter is commonly used. The D-parameter is defined as:

$$D = \frac{dT_g}{d\lambda},$$

where $T_g$, is the group delay and $\lambda$ is the wavelength. Within the field of lasers, it is more common to use $\beta_2$, the second derivative of the propagation constant ($\beta$):

$$\beta_2 = \frac{d^2\beta}{d\omega^2},$$

where $\omega$ is the angular frequency. These two parameters are uniquely related as follows:

$$D = -\frac{2\pi c}{\lambda^2}\beta_2,$$

where c is the speed of light in vacuum. In the remainder of the present description, the D-parameter will be used.

In current chirped pulse amplification systems, the stretcher unit and compressor unit are fabricated using free space diffraction grating pairs. However, generally speaking, a fiber-based approach is preferable to an approach using free space optics for a number of reasons. A fiber-based component typically has a smaller size, better stability, longer life, and lower cost, compared with a corresponding free space component.

It is currently not feasible for a compressor unit to be fabricated using an all-fiber approach. For pulse energies above a few nanojoules, the high peak intensities after compression would lead to significant pulse distortion due to nonlinearities in the compressor fiber. However, these high peak intensities are not an issue with respect to a stretcher unit because of the relatively low power of the laser output prior to amplification and compression. Thus, if a stretcher unit could be constructed using an all-fiber solution, then the entire laser amplification system, up until the compressor unit, could be fabricated from fiber, without any free space optics.

Figure 2:
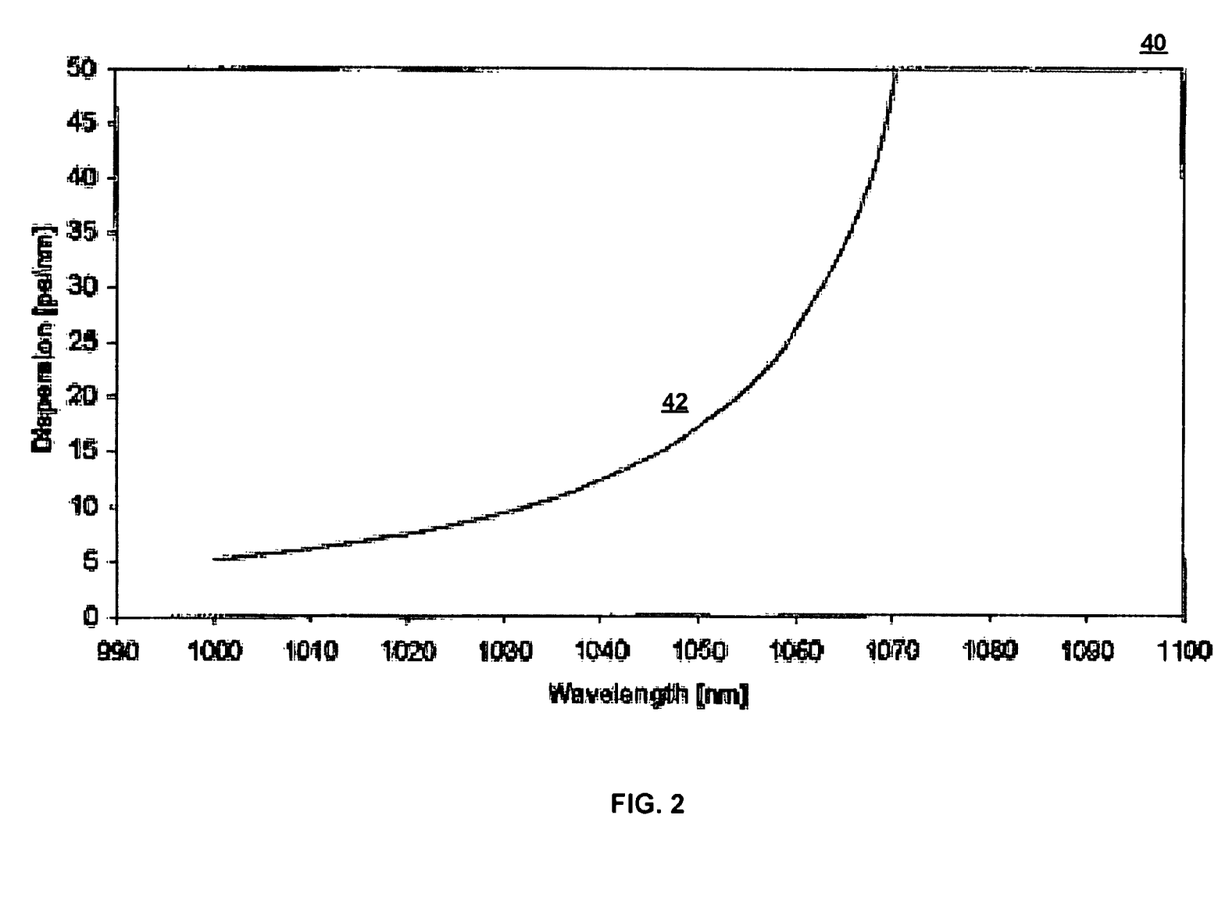
FIG. 2 is a graph in which dispersion is plotted against wavelength for a 1200 lines/mm grating compressor with a grating separation of 0.1 meters at an incidence angle of 18°.

However, there are a number of problems in designing a fiber for use as a stretcher. One problem is that a stretcher ideally should match the dispersion of compressor grating, not only at a single wavelength, but also in the whole spectral range of the pulses, typically 5-20 nm depending on the pulse duration. FIG. 2 shows a graph 40, in which the dispersion (D-parameter) 42 for a 1200 lines/mm grating compressor has been plotted as a function of wavelength, at an incidence angle of 18°, and a grating distance of 0.1 meters. As illustrated in FIG. 2, a grating compressor typically has a relatively large dispersion slope.

When designing fibers for both dispersion and dispersion slope compensation, a useful figure is the relative dispersion slope (RDS), which is defined as:

$$RDS = \frac{S}{D}, \text{ where } S = \frac{dD}{d\lambda}$$

When a fiber should compensate both dispersion and dispersion slope of a dispersion element, the fiber should have same RDS as the dispersion element. The RDS is related to the ratio of the third and second derivatives of the propagation constant through:

$$RDS = -\frac{2\pi c}{\lambda^2}\frac{\beta_3}{\beta_2} - \frac{2}{\lambda}, \text{ where } \beta_3 = \frac{d^3\beta}{d\omega^3}$$

Figure 3:
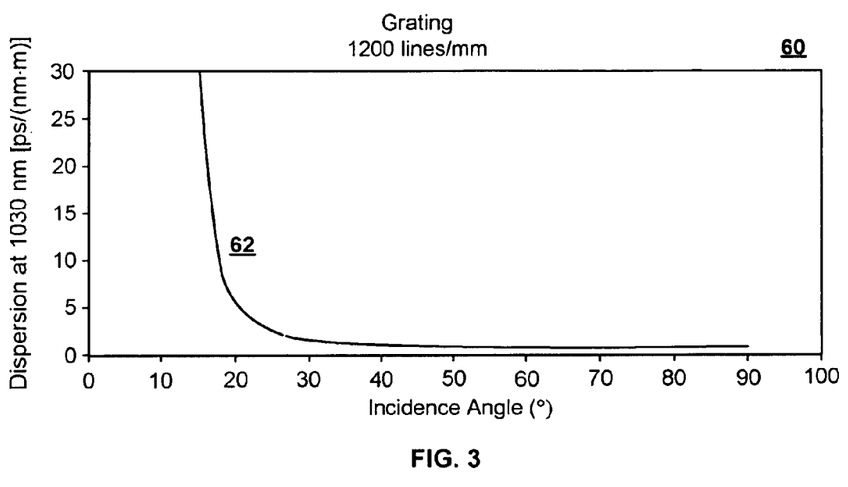
FIGS. 3 and 4 are graphs showing calculated dispersion and RDS at 1030 nm as a function of incidence angle for a 1200 lines/mm grating with a grating separation of 0.1 meters.
Figure 4:
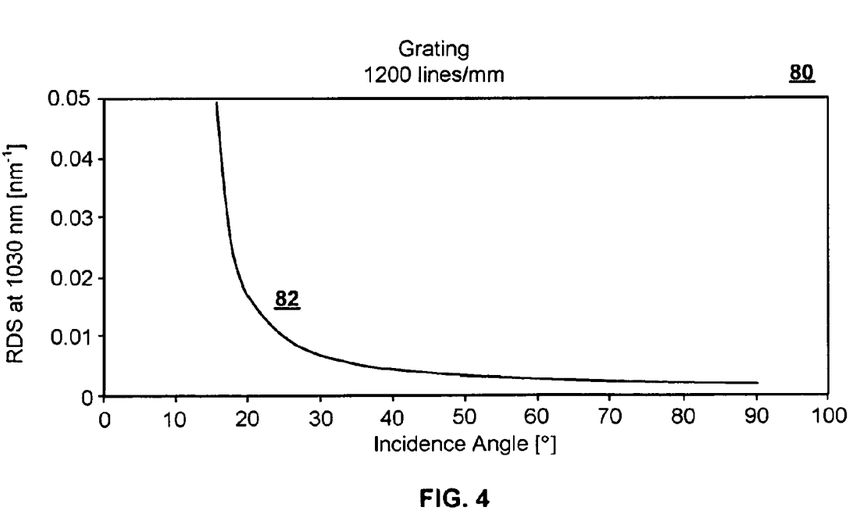

A general problem in the design of a stretcher fiber is to obtain a sufficiently high RDS. This is due to a general property of the compressor gratings. To obtain a sufficient stretch ratio, typically a dispersion D ranging from 5 ps/nm to several 100 ps/nm is required. To obtain such dispersion coefficients without too long distances between the gratings, it is necessary to operate the gratings at relatively low incidence angles. This however leads to relatively high RDS values. An example illustrating this is given in FIGS. 3 and 4, which are graphs 60 and 80 of calculated dispersion 62 and RDS 82 at 1030 nm as a function of incidence angle for a 1200 lines/mm grating with a grating separation of 0.1 meters.

An aspect of the invention provides a new stretcher fiber design that addresses these and other issues. The presently described example of the fiber has a negative dispersion D, and RDS>0.005 nm$^{-1}$. The fiber has been designed for use in a stretcher module in a chirped pulse amplification system for a short-pulse laser operating in a fiber laser, e.g., in the Yb-fiber gain band (amplification window), i.e., between 1000 nm and 1100 nm. However, it will be appreciated that the described fiber design maybe modified for use in chirped pulse amplification systems for short-pulse lasers operating at other wavelengths, such as, for example, in the 1550 nm band commonly used in existing dispersion compensating fiber technology, as well as in the 800 nm band typically used by Ti-sapphire lasers.

The new fiber is fabricated out of a suitable material that has been doped to create a plurality of regions, each having a respective refractive index. These regions include a central core region extending down the length of the fiber, and a series of concentric regions arranged in successive layers surrounding the core region. The fiber may be manufactured using techniques known in the art, such as, for example, a modified chemical vapor deposition (MCVD) technique, or the like.

Figure 5:
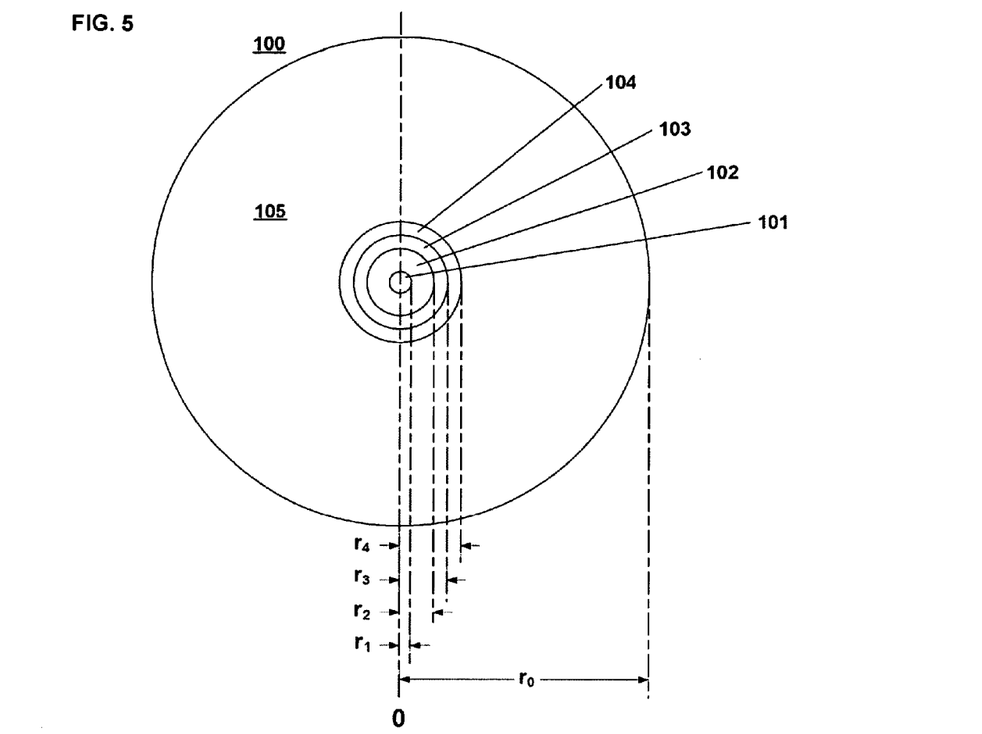
FIG. 5 shows a cross section of a stretcher fiber according to an aspect of the invention.

FIG. 5 shows a diagram of a cross section, not drawn to scale, of the new stretcher fiber 100. As shown in FIG. 5, the fiber includes the following regions: a core 101 having radius $r_1$, an inner trench 102 having outer radius $r_2$, a ring 103 having outer radius $r_3$, an outer trench 104 having outer radius $r_4$, and an outer cladding 105 having outer radius $r_0$. In addition, the fiber may be provided with one or more protective outer layers (not shown).

Figure 6:
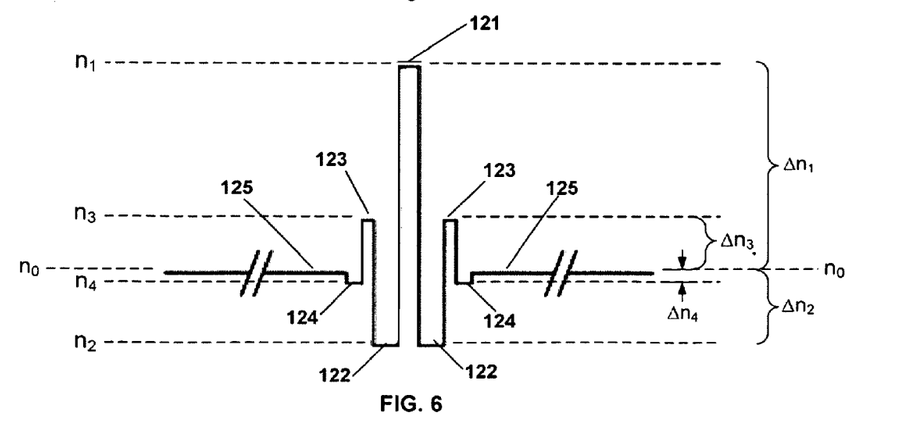
FIG. 6 shows a designed refractive index profile for the fiber shown in FIG. 5.
Figure 7:
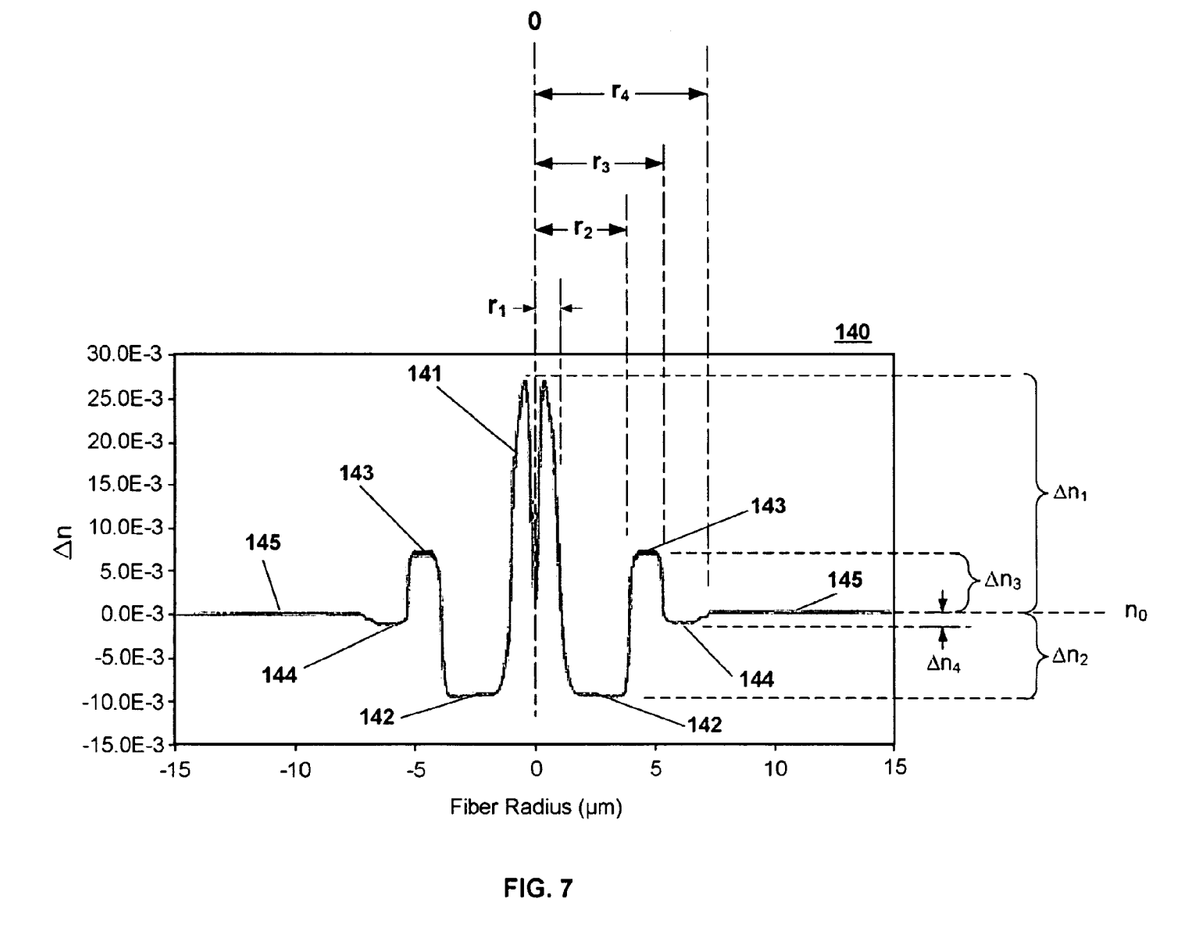
FIG. 7 shows a measured refractive index profile for a fiber manufactured in accordance with the refractive index profile shown in FIG. 6.

FIG. 6 shows a diagram of the desired refractive index profile 120 for the fiber, and FIG. 7 shows the measured refractive index profile 140 obtained from a fiber manufactured according to the desired refractive index profile. For the purpose of the present description, the refractive index of the outer cladding is expressed as $n_0$, and the refractive indices of the core, inner trench, ring, and outer trench are respectively expressed as $n_1$–$n_4$. Further, the refractive index of the outer cladding $n_0$ is used to determine the effective refractive index $\Delta n$ for each of the fiber regions. Thus, $\Delta n_1 = n_1 - n_0$;

$\Delta n_2 = n_2 - n_0$;

$\Delta n_3 = n_3 - n_0$; and $\Delta n_4 = n_4 - n_0$.

As shown in FIGS. 6 and 7, the refractive index profiles 120, 140 include a central spike 121, 141 corresponding to the core region 101, trenches 122, 142 corresponding to the inner trench 102, shoulders 123, 143 corresponding to the ring region 103, and smaller trenches 124, 144 corresponding to the outer trench 104.

Figure 8:
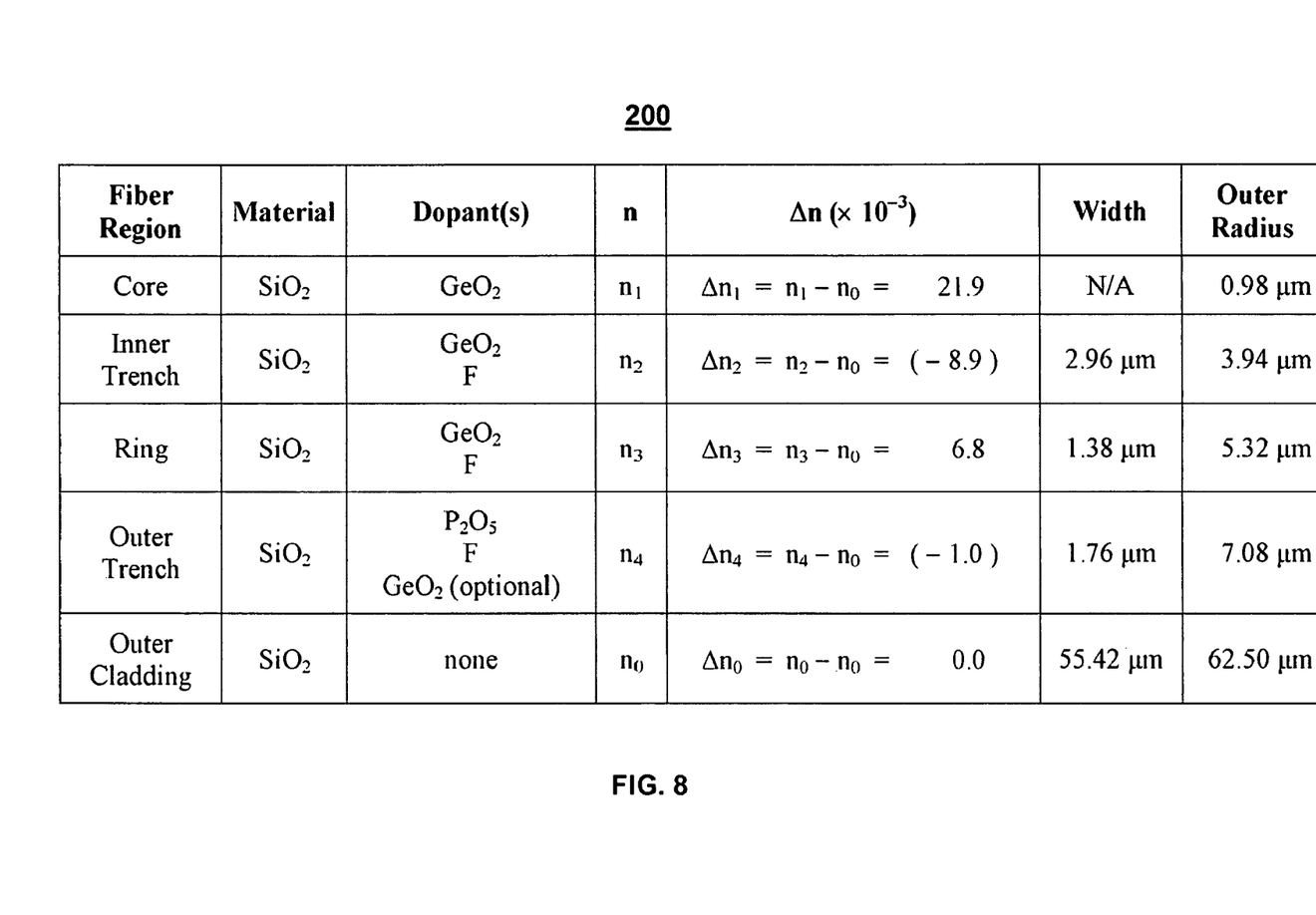
FIGS. 8 and 9 show tables setting forth specific design and performance details of the fiber shown in FIGS. 5-7.

FIG. 8 shows a table 200 setting forth the following details for each of the fiber regions: material, dopant, effective refractive index, width, and outer radius.

The material for all five fiber regions is $SiO_2$. Each individual region is created by adding a suitable amount of dopant. The outer cladding 105 is not doped, and has a refractive index $n_0$. The outer radius of the outer cladding is 62.5 micrometers. Thus, the diameter of the stretcher fiber is 125 micrometers.

The core 101 is doped with an index-raising dopant $GeO_2$ and has an effective refractive index $\Delta n_1 = n_1 - n_0 = 21.9 \times 10^{-3}$ and a radius of 0.98 micrometers.

The inner trench 102 is doped with an index-lowering mixture of dopants $GeO_2$ and F and has an effective refractive index $\Delta n_2 = n_2 - n_0 = -8.9 \times 10^{-3}$, a width of 2.96 micrometers, and an outer radius of 3.94 micrometers. Optionally, the trench can be doped with F only.

The ring 103 is doped with an index-raising mixture of dopants $GeO_2$ and F and has an effective refractive index $\Delta n_3 = n_3 - n_0 = 6.8 \times 10^{-3}$, a width of 1.38 micrometers, and an outer radius of 5.32 micrometers. Optionally, the ring can be doped with $GeO_2$ only.

The outer trench 104 is doped with an index-raising mixture of dopants $P_2O_5$ and F and has an effective refractive index $\Delta n_4 = n_4 - n_0 = -1.0 \times 10^{-3}$, a width of 1.76 micrometers, and an outer radius of 7.08 micrometers. Optionally, the mixture of dopants may also include $GeO_2$. As a second option, the outer trench could be doped with F only.

Figure 9:
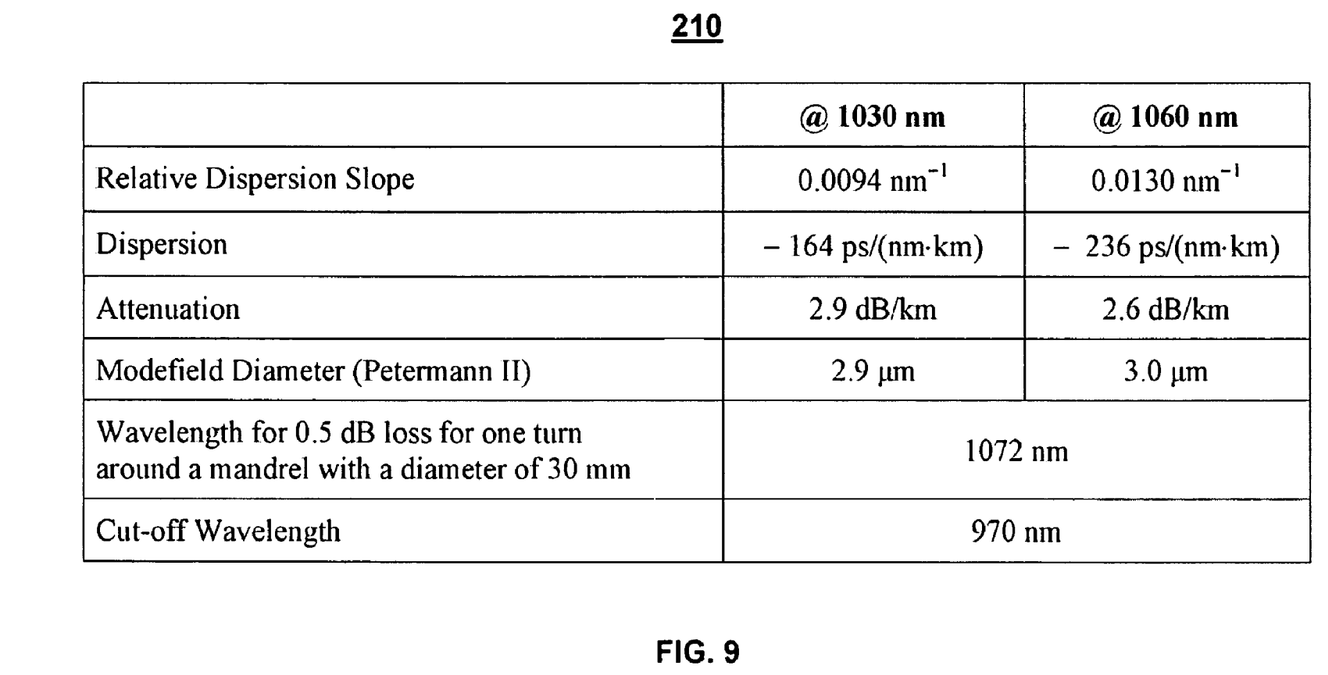

FIG. 9 is a table 210 setting forth various characteristics of a fiber manufactured in accordance with the table 200 set forth in FIG. 8. These characteristics include: relative dispersion slope; dispersion; attenuation; and modefield diameter at 1030 nm and at 1060 nm. The table further sets forth the wavelength resulting in 0.5 dB loss for one turn around a mandrel with a diameter of 30 mm, and the fiber's cutoff wavelength.

As shown in the table 210, at 1030 nm, the fiber has a relative dispersion slope of 0.0094 $nm^{-1}$, a dispersion of –164 ps/(nm-km), an attenuation of 2.9 dB/km and a modefield diameter of 2.9 micrometers. At 1060 nm, the fiber has a relative dispersion slope of 0.130 $nm^{-1}$, a dispersion of –236 ps/(nm-km), an attenuation of 2.6 dB/km, and a modefield diameter of 3.0 micrometers.

Figure 10:
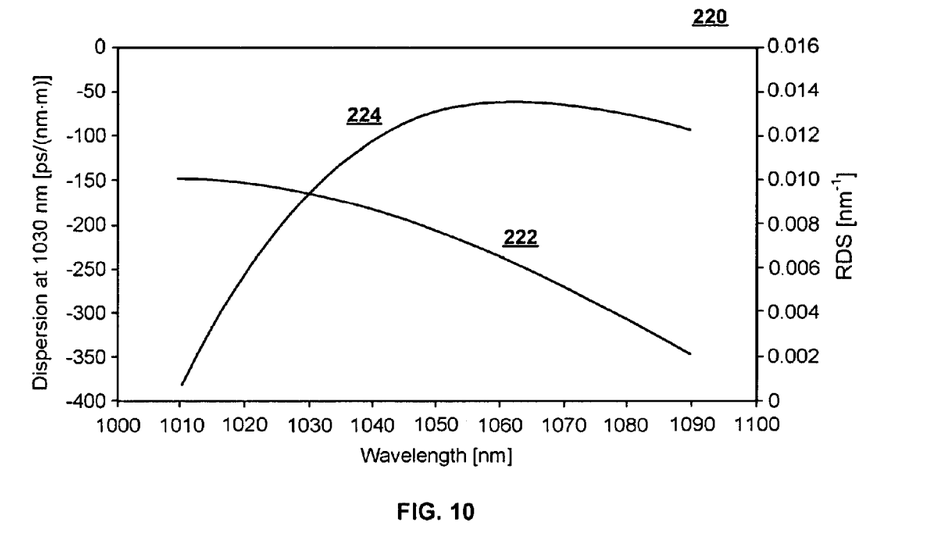
FIGS. 10 and 11 show graphs illustrating dispersion, RDS, and attenuation for the fiber shown in FIGS. 5-7.
Figure 11:
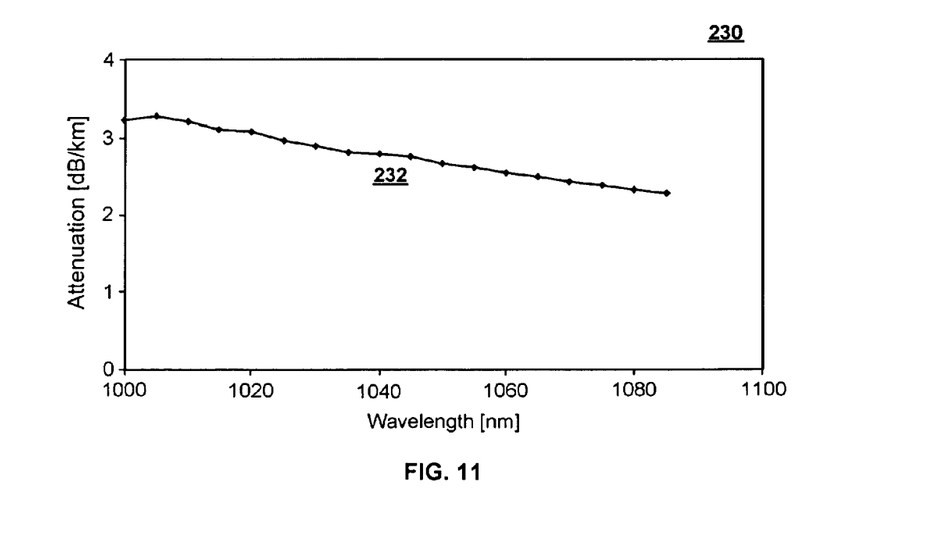

As further shown in table 210, the wavelength resulting in a 0.5 dB loss for one turn around a mandrel with a diameter of 30 mm is 1072 nm. The fiber's cutoff wavelength is 970 nm. It should be noted that the fiber has been designed to have a cutoff wavelength below the selected operating wavelength range. FIG. 10 shows a graph 220 in which dispersion 222 and RDS 224 are plotted as a function of wavelength. FIG. 11 shows a graph 230 in which attenuation 232 is plotted as a function of wavelength.

Figure 13:
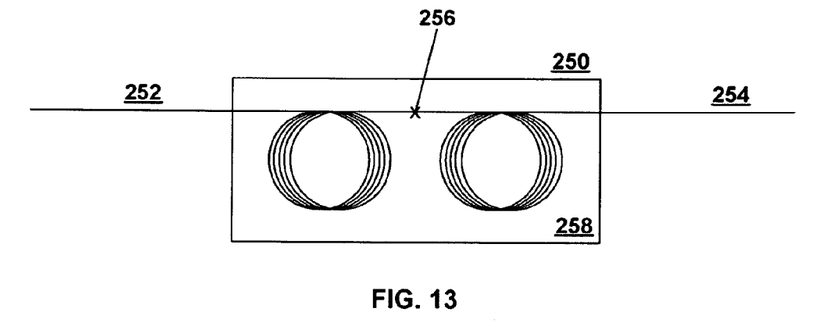
Figure 14:
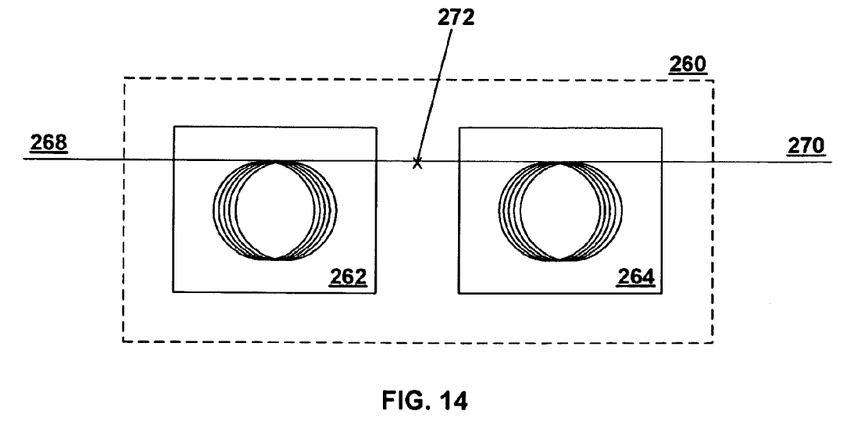

The described fiber may be used in a variety of configurations to form an all-fiber stretcher unit. Some of these configurations are schematically represented in FIGS. 12-14.

Figure 12:
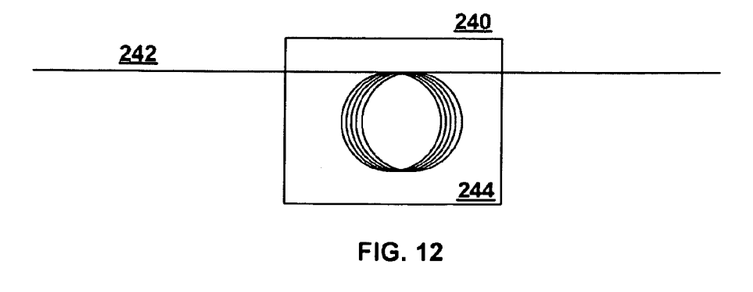
FIGS. 12-14 are diagrams of alternative configurations of a stretcher unit employing the stretcher fiber shown in FIGS. 5-7.

FIG. 12 shows a diagram of a stretcher module 240, in which a length of the new stretcher fiber 242 is loaded into a suitable package 244 and is used by itself to provide the above-described pulse stretching function. This approach would be used where the dispersion and RDS of the length of stretcher fiber 242 matches that of a given compressor unit, without the need for adjustment. If the required length of stretcher fiber 242 is sufficiently short, the fiber may be loaded into the package 244 in the form of a loosely wound coil. A greater length of fiber 242 may be loaded into the package 244 using a spool or other suitable structure.

According to a further aspect of the invention, the dispersion and RDS of a stretcher unit based on the new stretcher fiber may be precisely controlled by combining the stretcher fiber with a second fiber or fiber device having a selected dispersion and RDS. As used hereinafter, the term "fiber" is used to generally refer to a fiber, fiber device, fiber-based structure, or combinations thereof.

By selecting a suitable second fiber for use in combination with the new stretcher fiber, it is possible to precisely control both the overall dispersion and the overall relative dispersion slope of the stretcher module by trimming the lengths of one or both of the stretcher fiber and the second fiber. It should be noted that it would be possible, in principle, to extrapolate the present discussion to apply to a stretcher module in which the new stretcher fiber is combined with more than one other fiber to achieve the desired result, i.e., matching of the stretcher module to a particular compressor module.

The second fiber may be combined with the new stretcher fiber in various physical configurations. For example, as illustrated in FIG. 13, the stretcher fiber 252 and second fiber 254 are joined to each other at splice point 256 and housed together in a single package 258 for installation into a CPA system. Alternatively, as illustrated in FIG. 14, the stretcher module 260 may comprise a plurality of packaging units 262 and 264 housing respective lengths of stretcher fiber 268 and the second fiber 270, which are joined together at splice point 272. Stretcher modules based on a combination of the new stretcher fiber and a second fiber not only provide flexibility in controlling the amount of RDS that can be obtained, but also provide very precise control of both dispersion and RDS, as these can be controlled individually by adjusting the respective lengths of the two fibers.

Figure 15:
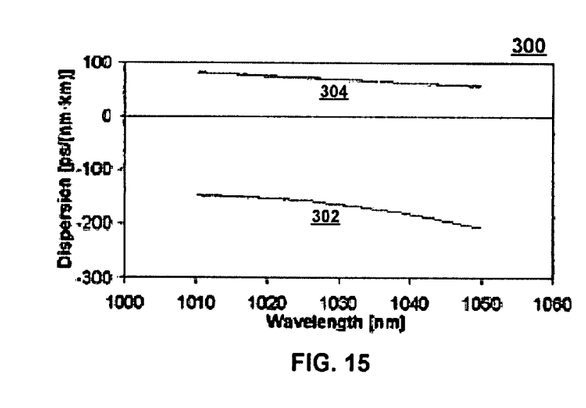
FIGS. 15-18 are graphs illustrating the use of the stretcher fiber shown in FIGS. 5-7 in combination with a second fiber to match the dispersion and RDS of a grating compressor unit.
Figure 16:
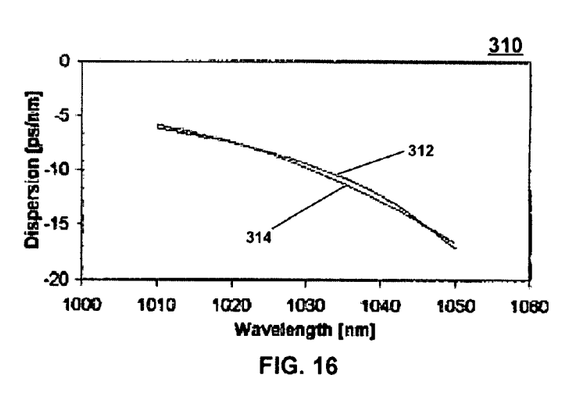

For example, it is possible to construct a stretcher unit with an RDS that is higher than that of the stretcher fiber alone by combining the stretcher fiber with a second fiber having a positive dispersion D and negative RDS. In one exemplary implementation, the stretcher fiber was combined with a fiber device with positive D and negative RDS operating in a higher order mode (HOM), e.g., the $LP_{02}$ mode. The fiber device used in the implementation is commercially available from OFS under the trade name FemtoComp™. FIGS. 15 and 16 show how by combining the new fiber (D=–164 ps/(nm-km) and RDS=0.0094 $nm^{-1}$ at 1030 nm) with FemtoComp™ (D=69 ps/(nm-km) and RDS=–0.0093 $nm^{-1}$ at 1030 nm), a grating compressor with an RDS of 0.0025 $nm^{-1}$ at 1030 nm can be matched.

FIG. 15 shows a graph 300 in which dispersion is plotted as a function of wavelength for the new fiber (lower plot 302) and for a FemtoComp™ fiber device (upper plot 304). FIG. 16 shows a graph 310 including a plot 312 of the target dispersion, −D of a 1200 lines/mm compressor grating, operating at an incidence angle of 18° and a grating separation of 0.1 m. The FIG. 16 graph further illustrates the dispersion plot 314 obtained by combining 119 meters of the new fiber followed by 142 meters of FemtoComp™ HOM fiber.

Figure 17:
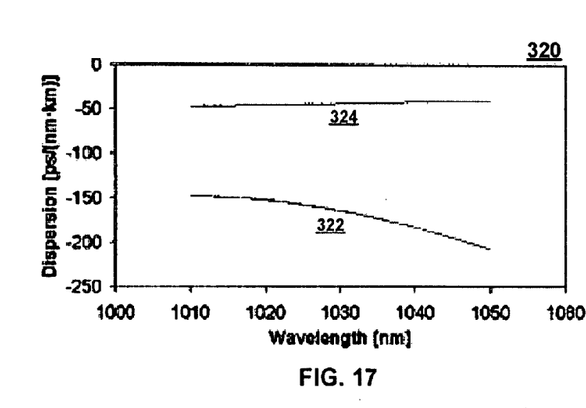
Figure 18:
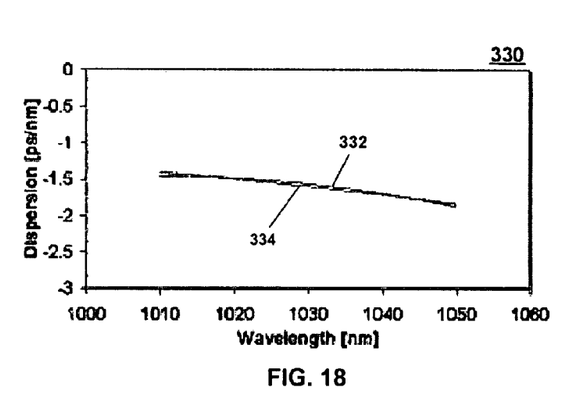

Alternatively, it is possible to construct a stretcher unit with an RDS that is lower than that of the stretcher fiber alone by combining the stretcher fiber with a second fiber or fiber device having a negative dispersion D and negative RDS. One such fiber, for example, is a standard low-cutoff single mode fiber, such as ClearLite™ 980-14 from OFS or HI-1060 from Corning. FIGS. 17 and 18 show how by combining the new fiber (D=−164 ps/(nm-km) and RDS=0.0094 nm$^{-1}$ at 1030 nm) with ClearLite™ 980-14 (D=−44 ps/(nm-km) and RDS=−0.0041 nm$^{-1}$ at 1030 nm) a grating compressor with a RDS of 0.0068 nm-km at 1030 nm can be matched.

FIG. 17 shows a graph 320 in which dispersion is plotted as a function of wavelength for the new fiber (lower plot 322) and for a ClearLite™ CL980-14 single mode fiber (upper plot 324). FIG. 18 shows a graph 330 setting forth a plot 332 of the target dispersion, −D of a 1200 lines/mm compressor grating working at an incidence angle of 30° and a grating separation of 0.1 m. The FIG. 16 graph further illustrates the dispersion plot 334 obtained by combining 7.8 meters of the new fiber followed by 6.5 meters of ClearLite™ CL980-14 fiber.

The splice loss resulting from splicing a length of the stretcher fiber to a length of standard low-cutoff fiber, such as ClearLite™ 980-14 from OFS or HI-1060 from Corning, has been tested. These fibers are routinely used in fiber lasers working in the band 1000 nm to 1100 nm. A splice loss of 0.17 dB to ClearLite™ 980-14 has been demonstrated, using the thermally expanded modefield technique described in U.S. Pat. No. 6,565,269, commonly owned with the present application, the disclosure and drawings of which are incorporated herein by reference in their entirety.

Figure 19:
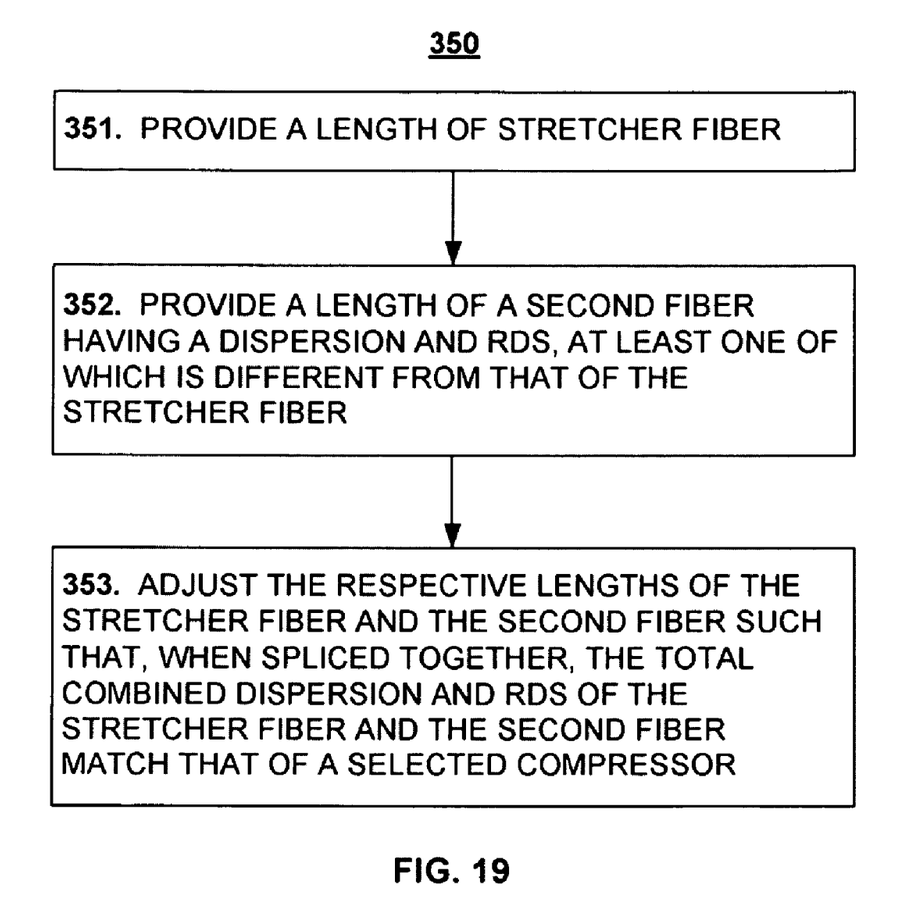
FIG. 19 is a flowchart of a method for constructing a stretcher module according to a further aspect of the invention.

FIG. 19 shows a flowchart of a general method 350 according to a further aspect of the invention. In step 351, a length of the new stretcher fiber is provided. In step 352, a length of a second fiber is provided having a dispersion and RDS, at least one of which is different from that of the stretcher fiber. In step 353, the respective lengths of the stretcher fiber and the second fiber are adjusted such that, when spliced together, the total combined dispersion and RDS of the stretcher fiber and the second fiber match that of a selected compressor.

It will be appreciated that the systems and techniques described above provide a number of advantages over the prior art. Compared to a grating-based stretcher, a system according to the present invention provides more precise control of both RDS and dispersion. In addition, the presently described system provides the advantages of smaller size, better stability, longer lifetime, and lower cost.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A stretcher fiber for use in an all-fiber stretcher module, comprising:

a core region having a radius $r_1$, a refractive index $n_1$, and a positive effective refractive index $\Delta n_1$ with respect to an outer cladding region having an outer radius $r_0$ and a refractive index $n_0$, where $\Delta n_1$ is equal to $n_1 - n_0$, an inner trench region surrounding the core region, the inner trench region having an outer radius $r_2$, a refractive index $n_2$ less than $n_0$, and a negative effective refractive index $\Delta n_2$ equal to $n_2 - n_0$, a ring region surrounding the inner trench region, the ring region having an outer radius $r_3$, a refractive index $n_3$ greater than $n_0$, and a positive effective refractive index $\Delta n_3$ equal to $n_3 - n_0$, an outer trench region surrounding the ring region, the outer trench region having an outer radius $r_4$, a refractive index $n_4$ less than $n_0$, and a negative effective refractive index $\Delta n_4$ equal to $n_4 - n_0$, the outer cladding region surrounding the outer trench region, the values of $r_0, r_1, r_2, r_3, r_4, \Delta n_1, \Delta n_2, \Delta n_3$, and $\Delta n_4$ causing the fiber to have a negative dispersion and to have a relative dispersion slope greater than 0.005nm$^{-1}$ at a specific wavelength within a selected operating wavelength band, wherein the stretcher fiber has a dispersion and relative dispersion slope corresponding to that of a selected compressor module in a chirped pulse amplification system, wherein the selected operating wavelength band is between 1000 and 1100 nm.

2. The stretcher fiber of claim 1, wherein the specific wavelength within the wavelength band is 1030 nm.

3. The stretcher fiber of claim 1, wherein the specific wavelength within the wavelength band is 1060 nm.

4. The stretcher fiber of claim 1, wherein the fiber has a cutoff wavelength below the selected operating wavelength band.

5. The stretcher fiber of claim 4, wherein the selected operating wavelength band is between 1000 and 1100 nm, and wherein the cutoff wavelength is 970 nm.

6. The stretcher fiber of claim 1, wherein the fiber is spliceable with a splice loss of less than 0.5 dB to a single-mode fiber having a cutoff wavelength below the operating wavelength band.

7. A stretcher fiber, comprising:

a core region having a radius $r_1$, a refractive index $n_1$, and a positive effective refractive index $\Delta n_1$ with respect to an outer cladding region having an outer radius $r_0$ and a refractive index $n_0$, where $\Delta n_1$ is equal to $n_1 - n_0$, an inner trench region surrounding the core region, the inner trench region having an outer radius $r_2$, a refractive index $n_2$ less than $n_0$, and a negative effective refractive index $\Delta n_2$ equal to $n_2 - n_0$, a ring region surrounding the inner trench region, the ring region having an outer radius $r_3$, a refractive index $n_3$ greater than $n_0$, and a positive effective refractive index $\Delta n_3$ equal to $n_3 - n_0$, an outer trench region surrounding the ring region, the outer trench region having an outer radius $r_4$, a refractive index $n_4$ less than $n_0$, and a negative effective refractive index $\Delta n_4$ equal to $n_4 - n_0$, the outer cladding region surrounding the outer trench region, the values of $r_0, r_1, r_2, r_3, r_4, \Delta n_1, \Delta n_2, \Delta n_3$, and $\Delta n_4$ causing the fiber to have a negative dispersion and to have a relative dispersion slope greater than 0.005nm$^{-1}$ at a specific wavelength within a selected operating wavelength band, wherein:

$r_0 = 0.98$ μm;

$r_1 = 3.94$ μm;

$r_2 = 5.32$ μm;

$r_3 = 7.08$ μm;

$r_4 = 62.50$ μm;

$\Delta n_1 = 21.9 \times 10^{-3}$;

$\Delta n_2 = -8.9 \times 10^{-3}$;

$\Delta n_3 = 6.8 \times 10^{-3}$;

and $\Delta n_4 = -1.0 \times 10^{-3}$.

8. The stretcher fiber of claim 7, wherein the core, inner trench, ring, outer trench, and outer cladding are fabricated from $SiO_2$, and wherein the core is doped with $GeO_2$.

9. The stretcher fiber of claim 8, wherein the inner trench is doped with a mixture of $GeO_2$ and F.

10. The stretcher fiber of claim 8, wherein the inner trench is doped only with F.

11. The stretcher fiber of claim 8, wherein the ring is doped with a mixture of $GeO_2$ and F.

12. The stretcher fiber of claim 8, wherein the ring is doped only with $GeO_2$.

13. The stretcher fiber of claim 8, wherein the outer trench is doped with a mixture of $P_2O_5$ and F.

14. The stretcher fiber of claim 13, wherein the outer trench is additionally doped with $GeO_2$.

15. The stretcher fiber of claim 8, wherein the outer trench is doped only with F.

16. A stretcher module for use in a pulse amplification system, the stretcher module comprising a length of the stretcher fiber of claim 1.

17. The stretcher module of claim 16, further including a second fiber spliced to the stretcher fiber, the dispersion and relative dispersion slope of the stretcher module being controllable by controlling the respective lengths of the stretcher fiber and the second fiber.

18. The stretcher module of claim 17, wherein the second fiber has a dispersion greater than zero and a relative dispersion slope less than zero, such that the stretcher module has a relative dispersion slope that is greater than the relative dispersion slope of the stretcher fiber.

19. The stretcher module of claim 17, wherein the second fiber has a dispersion less than zero and a relative dispersion slope less than zero, such that the stretcher module has a relative dispersion slope that is less than the relative dispersion slope of the stretcher fiber.

20. A method for constructing a stretcher module for use in a pulse amplification system, comprising:
(a) providing a length of the stretcher fiber of claim 1;
(b) providing a length of a second fiber having a dispersion and relative dispersion slope, at least one of which different from that of the stretcher fiber; and
(c) adjusting the respective lengths of the stretcher fiber and the second fiber such that, when spliced together, the total combined dispersion and relative dispersion slope of the stretcher fiber and the second fiber match that of a selected compressor unit.

21. The method of claim 20, wherein the second fiber has a dispersion greater than zero and a relative dispersion slope less than zero, such that the stretcher module has a relative dispersion slope that is greater than the relative dispersion slope of the stretcher fiber.

22. The method of claim 20, wherein the second fiber has a dispersion less than zero and a relative dispersion slope less than zero, such that the stretcher module has a relative dispersion slope that is less than the relative dispersion slope of the stretcher fiber.

* * * * *